(12) United States Patent
Littrell et al.

(10) Patent No.: US 8,583,551 B2
(45) Date of Patent: Nov. 12, 2013

(54) SYSTEMS AND METHODS FOR PREPAID ELECTRIC METERING FOR VEHICLES

(75) Inventors: Nathan Bowman Littrell, Gardnerville, NV (US); Richard Dale Slates, Minden, NV (US)

(73) Assignee: General Electric Company, Schenectady, NY (US)

( * ) Notice: Subject to any disclaimer, the term of this patent is extended or adjusted under 35 U.S.C. 154(b) by 517 days.

(21) Appl. No.: 12/341,467

(22) Filed: Dec. 22, 2008

(65) Prior Publication Data
US 2010/0161479 A1    Jun. 24, 2010

(51) Int. Cl.
*G06Q 40/00*    (2012.01)

(52) U.S. Cl.
USPC .............................. 705/40; 705/35; 705/412

(58) Field of Classification Search
USPC ............................................ 705/40, 412, 35
See application file for complete search history.

(56) References Cited

U.S. PATENT DOCUMENTS

| | | | |
|---|---|---|---|
| 3,775,593 A | 11/1973 | Gieringer et al. |
| 4,052,655 A | 10/1977 | Vizza |
| 4,090,577 A | 5/1978 | Moore |
| 4,532,418 A | 7/1985 | Meese et al. |
| 4,592,436 A | 6/1986 | Tomei |
| 4,629,874 A | 12/1986 | Pugsley et al. |
| 4,731,575 A | 3/1988 | Sloan |
| 5,072,380 A | 12/1991 | Randelman et al. |
| 5,101,200 A | 3/1992 | Swett |
| 5,146,067 A | 9/1992 | Sloan et al. |
| 5,202,617 A | 4/1993 | Nor |
| 5,247,304 A | 9/1993 | D'Hont |
| 5,266,947 A | 11/1993 | Fujiwara et al. |
| 5,296,746 A | 3/1994 | Burkhardt |
| 5,297,664 A | 3/1994 | Tseng et al. |
| 5,306,999 A | 4/1994 | Hoffman |
| 5,316,101 A | 5/1994 | Gannon |
| 5,327,066 A | 7/1994 | Smith |
| 5,351,052 A | 9/1994 | D'Hont et al. |
| 5,351,187 A | 9/1994 | Hassett |

(Continued)

FOREIGN PATENT DOCUMENTS

| | | |
|---|---|---|
| CN | 2573304 Y | 9/2003 |
| CN | 200953476 Y | 9/2007 |

(Continued)

OTHER PUBLICATIONS

European Patent Office Search Report, EP09178316, Reference 233500/14458, Application No./Patent No. 09178316.7-2221, Feb. 12, 2010, 7 pages.

(Continued)

*Primary Examiner* — Kenneth Bartley
(74) *Attorney, Agent, or Firm* — General Electric Company (57) ABSTRACT

A method for delivering energy to an electric vehicle is provided, wherein the electric vehicle is associated with a customer account. The method includes identifying the electric vehicle at an energy delivery point, and determining a current balance of the customer account, wherein the current balance includes at least a portion of a prepayment amount based on a predetermined amount of energy to be delivered to the electric vehicle at the energy delivery point. The method also includes delivering energy to the electric vehicle, metering an actual amount of energy delivered to the electric vehicle, and determining a transaction amount based on the actual amount of energy delivered to the electric vehicle at the energy delivery point.

22 Claims, 3 Drawing Sheets

(56) References Cited

U.S. PATENT DOCUMENTS

| | | |
|---|---|---|
| 5,414,624 A | 5/1995 | Anthonyson |
| 5,428,363 A | 6/1995 | D'Hont |
| 5,451,755 A | 9/1995 | Duval et al. |
| 5,459,304 A | 10/1995 | Eisenmann |
| 5,461,298 A | 10/1995 | Lara et al. |
| 5,462,439 A | 10/1995 | Keith |
| 5,485,510 A | 1/1996 | Colbert |
| 5,488,376 A | 1/1996 | Hurta et al. |
| 5,491,483 A | 2/1996 | D'Hont |
| 5,512,787 A | 4/1996 | Dederick |
| 5,513,525 A | 5/1996 | Schurmann |
| 5,534,759 A | 7/1996 | Evans et al. |
| 5,552,789 A | 9/1996 | Schuermann |
| 5,563,491 A | 10/1996 | Tseng |
| 5,573,090 A | 11/1996 | Ross |
| 5,577,109 A | 11/1996 | Stimson et al. |
| 5,583,418 A | 12/1996 | Honda et al. |
| 5,602,919 A | 2/1997 | Hurta et al. |
| 5,604,342 A | 2/1997 | Fujioka |
| 5,605,182 A | 2/1997 | Oberrecht et al. |
| 5,614,808 A | 3/1997 | Konoya et al. |
| 5,640,002 A | 6/1997 | Ruppert et al. |
| 5,675,342 A | 10/1997 | Sharpe |
| 5,684,379 A | 11/1997 | Svedoff |
| 5,692,132 A | 11/1997 | Hogan |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,742,229 A | 4/1998 | Smith |
| 5,745,052 A | 4/1998 | Matsuyama et al. |
| 5,774,882 A | 6/1998 | Keen et al. |
| 5,797,085 A | 8/1998 | Beuk et al. |
| 5,797,133 A | 8/1998 | Jones et al. |
| 5,809,142 A | 9/1998 | Hurta et al. |
| 5,828,738 A | 10/1998 | Spaeth |
| 5,847,537 A | 12/1998 | Parmley, Sr. |
| 5,878,215 A | 3/1999 | Kling et al. |
| 5,887,266 A | 3/1999 | Heinonen et al. |
| 5,905,247 A | 5/1999 | Ilen |
| 5,955,717 A | 9/1999 | Vanstone |
| 5,974,403 A | 10/1999 | Takriti et al. |
| 5,987,140 A | 11/1999 | Rowney et al. |
| 5,991,750 A | 11/1999 | Watson |
| 5,998,963 A | 12/1999 | Aarseth |
| 6,012,049 A | 1/2000 | Kawan |
| 6,064,320 A | 5/2000 | d'Hont et al. |
| 6,073,840 A | 6/2000 | Marion |
| 6,081,205 A | 6/2000 | Williams |
| 6,107,691 A | 8/2000 | Gore et al. |
| 6,109,525 A | 8/2000 | Blomqvist et al. |
| 6,112,152 A | 8/2000 | Tuttle |
| 6,116,505 A | 9/2000 | Withrow |
| 6,157,162 A | 12/2000 | Hayashi et al. |
| 6,285,162 B1 | 9/2001 | Koo |
| 6,317,721 B1 | 11/2001 | Hurta et al. |
| 6,340,935 B1 | 1/2002 | Hall |
| 6,481,622 B2 | 11/2002 | Hjelmvik |
| 6,487,508 B1 | 11/2002 | Suzuki et al. |
| 6,513,015 B2 | 1/2003 | Ogasawara |
| 6,547,133 B1 | 4/2003 | DeVries, Jr. et al. |
| 6,586,668 B2 | 7/2003 | Shugar et al. |
| 6,609,655 B1 | 8/2003 | Harrell |
| 6,614,204 B2 | 9/2003 | Pellegrino et al. |
| 6,656,778 B1 | 12/2003 | Chen et al. |
| 6,673,479 B2 | 1/2004 | McArthur et al. |
| 6,696,925 B1 | 2/2004 | Aiello, Jr. |
| 6,714,844 B1 | 3/2004 | Dauner et al. |
| 6,756,765 B2 | 6/2004 | Bruning |
| 6,758,291 B1 | 7/2004 | Koch |
| 6,836,737 B2 | 12/2004 | Petite et al. |
| 6,910,439 B2 | 6/2005 | Baba et al. |
| 6,963,186 B2 | 11/2005 | Hobbs |
| 7,081,832 B2 | 7/2006 | Nelson et al. |
| 7,141,321 B2 | 11/2006 | McArthur et al. |
| 7,142,099 B2 | 11/2006 | Ross et al. |
| 7,209,840 B2 | 4/2007 | Petite et al. |
| 7,236,103 B2 | 6/2007 | Pammer et al. |
| 7,239,226 B2 | 7/2007 | Berardi et al. |
| 7,312,707 B1 | 12/2007 | Bishop et al. |
| 7,338,335 B1 | 3/2008 | Messano |
| 7,411,371 B2 | 8/2008 | Hobbs |
| 7,429,112 B2 | 9/2008 | Metcalfe |
| 7,434,636 B2 | 10/2008 | Sutherland |
| 7,469,541 B1 | 12/2008 | Melton et al. |
| RE41,085 E | 1/2010 | Anthonyson |
| 7,693,609 B2 | 4/2010 | Kressner et al. |
| 7,792,613 B2 * | 9/2010 | Kressner et al. ............... 700/296 |
| 7,885,893 B2 * | 2/2011 | Alexander ........................ 705/40 |
| 8,019,483 B2 * | 9/2011 | Keefe |
| 2001/0026609 A1 * | 10/2001 | Weinstein et al. ........... 379/93.01 |
| 2002/0052754 A1 * | 5/2002 | Joyce et al. ........................ 705/1 |
| 2002/0132144 A1 | 9/2002 | McArthur et al. |
| 2003/0004792 A1 | 1/2003 | Townzen et al. |
| 2003/0105662 A1 | 6/2003 | Koketsu et al. |
| 2003/0120442 A1 | 6/2003 | Pellegrino et al. |
| 2003/0129884 A1 | 7/2003 | Wakamatsu |
| 2003/0146852 A1 | 8/2003 | O'Dell |
| 2003/0209375 A1 * | 11/2003 | Suzuki et al. .................. 180/65.3 |
| 2004/0079799 A1 | 4/2004 | Symonds et al. |
| 2004/0104814 A1 | 6/2004 | Christensen et al. |
| 2004/0153782 A1 | 8/2004 | Fukui et al. |
| 2004/0200899 A1 | 10/2004 | Jeng et al. |
| 2005/0008132 A1 * | 1/2005 | Paschini et al. ............. 379/93.12 |
| 2005/0057373 A1 | 3/2005 | Noguchi |
| 2005/0119010 A1 | 6/2005 | Yasukawa |
| 2005/0273505 A1 | 12/2005 | Kim |
| 2006/0012473 A1 | 1/2006 | Bishop et al. |
| 2006/0041513 A1 | 2/2006 | Yuhara et al. |
| 2006/0180647 A1 | 8/2006 | Hansen |
| 2006/0193282 A1 | 8/2006 | Ikawa et al. |
| 2006/0202862 A1 | 9/2006 | Ratnakar |
| 2006/0259447 A1 | 11/2006 | Kings et al. |
| 2007/0094069 A1 | 4/2007 | Berman |
| 2007/0126395 A1 | 6/2007 | Suchar |
| 2007/0255612 A1 | 11/2007 | Baraty |
| 2008/0039979 A1 | 2/2008 | Bridges et al. |
| 2008/0039980 A1 | 2/2008 | Pollack et al. |
| 2008/0039989 A1 | 2/2008 | Pollack et al. |
| 2008/0040223 A1 | 2/2008 | Bridges et al. |
| 2008/0040263 A1 | 2/2008 | Pollack et al. |
| 2008/0040295 A1 | 2/2008 | Kaplan et al. |
| 2008/0040296 A1 | 2/2008 | Bridges et al. |
| 2008/0040479 A1 | 2/2008 | Bridge et al. |
| 2008/0052145 A1 | 2/2008 | Kaplan et al. |
| 2008/0067974 A1 | 3/2008 | Zhang et al. |
| 2008/0150284 A1 | 6/2008 | Fein et al. |
| 2008/0150290 A1 | 6/2008 | Fein et al. |
| 2008/0203966 A1 | 8/2008 | Ward |
| 2008/0203973 A1 | 8/2008 | Gale et al. |
| 2008/0228613 A1 * | 9/2008 | Alexander ........................ 705/35 |
| 2008/0270227 A1 | 10/2008 | Al Amri |
| 2008/0281663 A1 * | 11/2008 | Hakim et al. ..................... 705/8 |
| 2009/0062967 A1 * | 3/2009 | Kressner et al. ............... 700/286 |
| 2009/0062997 A1 | 3/2009 | Iwase et al. |
| 2009/0115371 A1 * | 5/2009 | Chawla et al. ................. 320/134 |
| 2009/0144150 A1 | 6/2009 | Sakakibara et al. |
| 2009/0177580 A1 | 7/2009 | Lowenthal et al. |
| 2009/0177595 A1 | 7/2009 | Dunlap et al. |
| 2009/0313033 A1 * | 12/2009 | Hafner et al. ..................... 705/1 |
| 2009/0313034 A1 | 12/2009 | Ferro et al. |
| 2009/0313103 A1 | 12/2009 | Ambrosio et al. |
| 2009/0313104 A1 | 12/2009 | Hafner et al. |
| 2010/0010685 A1 * | 1/2010 | Kang ............................ 700/296 |
| 2010/0045232 A1 | 2/2010 | Chen et al. |
| 2010/0065627 A1 | 3/2010 | Outwater |
| 2010/0079004 A1 | 4/2010 | Keefe |
| 2010/0082464 A1 | 4/2010 | Keefe |
| 2010/0141203 A1 | 6/2010 | Graziano et al. |
| 2010/0145837 A1 | 6/2010 | Graziano et al. |
| 2010/0145885 A1 | 6/2010 | Graziano et al. |

(56) References Cited

U.S. PATENT DOCUMENTS

2011/0153131 A1 6/2011 Kressner et al.
2011/0153474 A1 6/2011 Tormey et al.

FOREIGN PATENT DOCUMENTS

| CN | 101076190 A | 11/2007 |
|---|---|---|
| DE | 10304284 A1 | 8/2004 |
| EP | 0479290 A2 | 4/1992 |
| EP | 1205340 A1 | 5/2002 |
| EP | 1588930 A1 | 10/2005 |
| EP | 1862986 A1 | 5/2007 |
| GB | 2430529 A | 3/2007 |
| GB | 2438979 A | 12/2007 |
| JP | 05256038 A | 5/1993 |
| JP | 2002150337 A | 5/2002 |
| WO | 02063742 A1 | 8/2002 |
| WO | WO02063742 A1 | 8/2002 |
| WO | 2008073453 A1 | 6/2008 |
| WO | 2008107767 A2 | 9/2008 |

OTHER PUBLICATIONS

PCT, International Search Report for International Patent Application No. PCT/US2009/065229, dated Feb. 25, 2010, 4 pages.
European Patent Office, Search Report for European Patent Application No. 09178452.0-2207, dated Mar. 23, 2010, 4 pages.
Rich Housh & Kathy Ellington, "Plug-in Hybrid Electric Vehicle Smart Charging," available at http://www.eei.org/meetings/Meeting%20Documents/2009-04-05-Mon-Ellington.pdf (last visited Jul. 23, 2009).
Radio Frequency Identification Tag Application for Tracking Vehicle Refueling, Maintenance, and Theft, XP000694521, IBM Techncal Disclosure Bulletin, Mar. 1997, pp. 81-82, vol. 40, No. 03.
Green Car Versatile Plug, ip.com Prior Art Database, http://www.ip.com/pubview///IPCOM000177564D, IBM, Dec. 18, 2008, 4 pages.
C.M. Roberts, Radio Frequency Identification (RFID), Department of Information Sciences, Otago University, New Zealand, Science Direct, Computers & Security, 2006, pp. 18-26, vol. 25, Elsevier Ltd.
Patent Cooperation Treaty, PCT/US2009/065356, Notification of Transmittal of the International Search Report and the Written Opinion of the International Searching Authority, or the Declaration, Mar. 31, 2010, 14 pages.
Patent Cooperation Treaty, PCT/US2009/066930, Notification of Transmittal of the International Search Report and the Written Opinion of the International Searching Authority, or the Declaration, Jun. 25, 2010, 10 pages.
EP Foreign Search Report for Application No. 09178313.4-2221 dated Jan. 26, 2010.
Chinese Search Report for Application 200980152817.8 dated Dec. 11, 2012.
Chinese Office Action for Application 200980152817.8 dated Dec. 26, 2012.
Chinese Office Action for Application 200980152855.3 dated Jan. 14, 2013.
Chinese Search Report for Application 200980152855.3 dated Dec. 20, 2012.
The Associated Press, Hawaii to be First with Electric Car Stations, Dec. 3, 2008, 2 pagea, MSNBC.com.
IBM Technical Disclosure, Green Car Versatile Plug, IPCOM000177564D, Dec. 28, 2008.

* cited by examiner

SYSTEMS AND METHODS FOR PREPAID ELECTRIC METERING FOR VEHICLES

BACKGROUND OF THE INVENTION

The subject matter disclosed herein relates generally to prepaid electric metering and more specifically, to paying in advance for energy consumed by an electric vehicle and maintaining an account, including an account balance, based on an amount of energy delivered to the electric vehicle.

As electric vehicles and/or hybrid electric vehicles gain popularity, an associated need to accurately manage delivery of electrical energy to them has increased. Moreover, a need to recognize revenue due to the utility that provides the energy has been created by the increased use of such vehicles.

At least some known electric delivery systems provide electric metering at a customer's premises. For example, some of such systems use an encoded magnetic strip that is applied to a card to transfer purchase information between a utility billing office and a utility metering and control device located at the customer's premises. A credit meter stored within the control device deducts a value associated with an amount of electricity consumed at the customer's premises. Some of such systems also enable the use of an emergency card that includes a similar encoded magnetic strip when the customer's account with the pre-purchased amount is exhausted. However, generally such systems are not compatible with use with electric vehicles.

Moreover, at least some known electric delivery systems enable mobile metering of electricity use. For example, some of such systems measure power delivered, while work is performed on a power network, using a mobile meter system (MMS) that receives high voltage inputs by connecting secondary side conductors and neutrals of a substation transformer to designated terminals on the MMS. The MMS then transforms the inputs using metering instruments and provides meterable currents and voltages that are accessible via an external metering cabinet. However, such mobile systems do not measure prepaid electricity delivery to electric vehicles.

Furthermore, at least some known systems provide remote monitoring of electricity consumption. For example, some of such systems provide remote monitoring via wireless communication between a communication device associated with an electric meter and a site controller. More specifically, a communication device receives data from an associated electric meter that is related to an amount of electricity metered, and generates a transmit message to the site controller using a wireless communication network. However, such systems do not measure prepaid electricity delivery to electric vehicles.

Accordingly, it is desirable to provide systems and methods for paying in advance for energy to be consumed by an electric vehicle, metering the amount of energy delivered to the electric vehicle, and adjusting an account according to the amount of energy delivered to the electric vehicle.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, method for delivering energy to an electric vehicle includes identifying the electric vehicle at an energy delivery point, wherein the electric vehicle is associated with a customer account, and determining a current balance of the customer account, wherein the current balance includes at least a portion of a prepayment amount based on a predetermined amount of energy to be delivered to the electric vehicle at the energy delivery point. The method also includes delivering energy to the electric vehicle, metering an actual amount of energy delivered to the electric vehicle, and determining a transaction amount based on the actual amount of energy delivered to the electric vehicle at the energy delivery point.

In another aspect, a system for providing energy to an electric vehicle includes an energy delivery point and a server coupled to the energy delivery point. The energy delivery point is configured to receive a unique identifier embedded in the electric vehicle, deliver energy to the electric vehicle, and meter an actual amount of energy delivered to the electric vehicle. The server is configured to receive the unique identifier from the energy delivery point, and identify the electric vehicle based on the unique identifier, wherein the electric vehicle is associated with a customer account. The server is also configured to determine a current balance of the customer account, wherein the current balance includes at least a portion of a prepayment amount associated with a predetermined amount of energy to be delivered to the electric vehicle by the energy delivery point, and to determine a transaction amount based on the actual amount of energy delivered to the electric vehicle.

In another aspect, a controller is coupled to an energy delivery point and a database for providing energy to an electric vehicle. The controller is programmed to receive a unique identifier from the energy delivery point, wherein the unique identifier is acquired by the energy delivery point from the electric vehicle, and to identify the electric vehicle based on the unique identifier, wherein the electric vehicle is associated with a customer account. The controller is also programmed to determine a current balance of the customer account, wherein the current balance includes at least a portion of a prepayment amount associated with a predetermined amount of energy to be delivered to the electric vehicle by the energy delivery point. The controller is also configured to receive, from the energy delivery point, an actual amount of energy delivered to the electric vehicle and to determine a transaction amount based on the actual amount of energy delivered to the electric vehicle.

BRIEF DESCRIPTION OF THE DRAWINGS

The embodiments described herein may be better understood by referring to the following description in conjunction with the accompanying drawings.

DETAILED DESCRIPTION OF THE INVENTION

In some embodiments, the term "electric vehicle" refers generally to a vehicle that includes one or more electric motors that are used for propulsion. Energy used to propel electric vehicles may come from various sources, such as, but not limited to, an on-board rechargeable battery and/or an on-board fuel cell. In one embodiment, the electric vehicle is a hybrid electric vehicle, which captures and stores energy generated by braking. Moreover, a hybrid electric vehicle uses energy stored in an electrical source, such as a battery, to continue operating when idling to conserve fuel. Some hybrid electric vehicles are capable of recharging the battery by plugging into a power receptacle, such as a general power outlet. Another example of an electric vehicle is a fuel-cell vehicle, which uses only electrical energy for propulsion. Accordingly, the term "electric vehicle" as used herein may refer to a hybrid electric vehicle, a fuel-cell vehicle, or any other vehicle to which electrical energy may be delivered via the power grid.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

Although described in connection with an exemplary metering system environment, embodiments of the invention are operational with numerous other general purpose or special purpose computing system environments or configurations. The metering system environment is not intended to suggest any limitation as to the scope of use or functionality of any aspect of the invention. Moreover, the metering system environment should not be interpreted as having any dependency or requirement relating to any one or combination of components illustrated in the exemplary operating environment. Examples of well known metering systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more controllers, computers, or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

Technical effects of the methods, systems, and computers described herein include at least one of (a) identifying an electric vehicle at an energy delivery point using a unique identifier transmitted by RFID, an active wireless connection, or a physical connection; (b) identifying a customer account associated with the electric vehicle; (c) determining a current balance of the customer account, wherein the current balance includes at least a portion of a prepayment amount related to a predetermined amount of energy to be delivered to the electric vehicle; (d) approving or denying energy delivery to the electric vehicle from the energy delivery point based on the current balance and/or a transaction hold placed on the account; (e) delivering energy to the electric vehicle from the energy delivery point; (f) metering an actual amount of energy delivered to the electric vehicle; (g) determining a transaction amount based on the actual amount of energy delivered and comparing the transaction amount to the current balance; (h) deducting the transaction amount from the current balance; and (i) generating a confirmation of receipt of the energy to delivered the electric vehicle.

Figure 1:
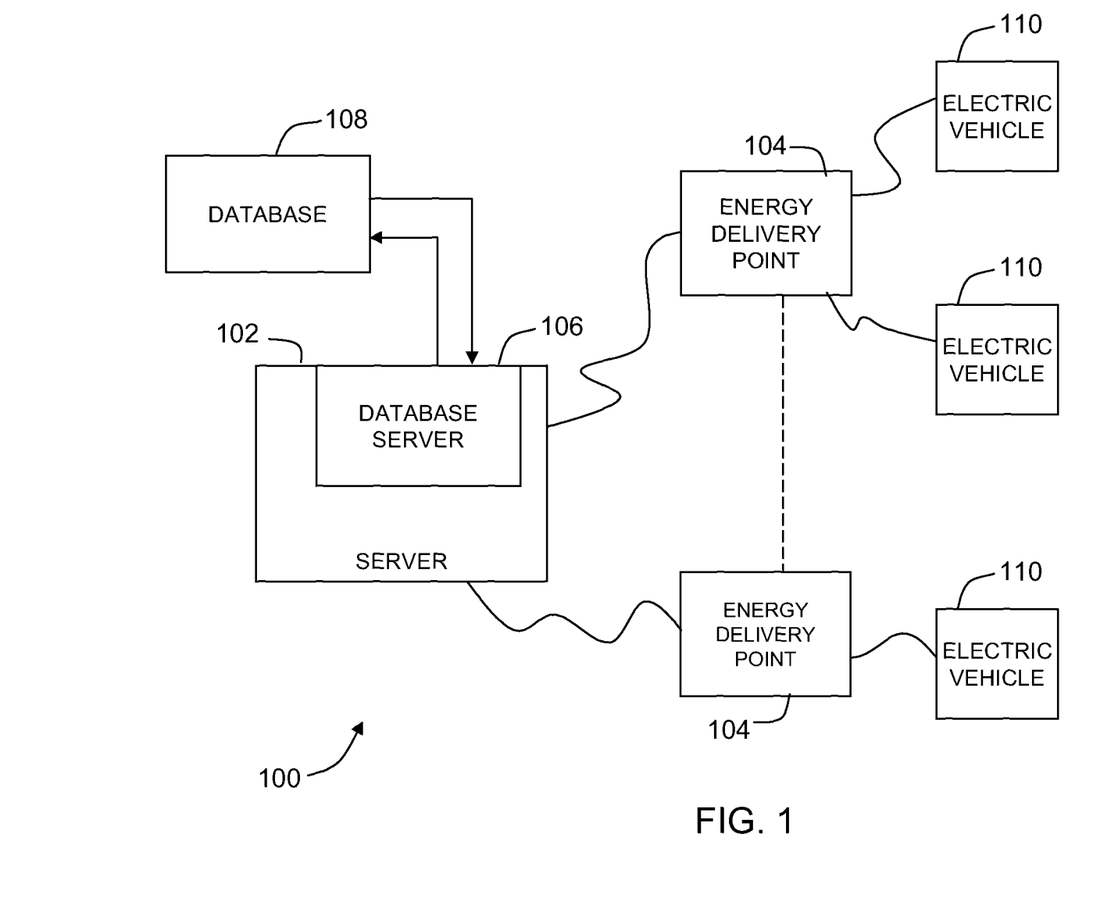
FIG. 1 is a simplified block diagram of an exemplary system for use in providing electricity to an electric vehicle.

FIG. 1 is a simplified block diagram of an exemplary system 100 for providing electricity to an electric vehicle 110. In the exemplary embodiment, system 100 includes a server system 102 and an energy delivery point 104 that is coupled to server system 102. As shown in FIG. 1, server system 102 may be coupled to a plurality of delivery points 104. In one embodiment, delivery points 104 include a network link (not shown in FIG. 1) that enables each delivery point 104 to access server system 102 over a network, such as the Internet and/or an intranet. Delivery points 104 are interconnected to the Internet through many interfaces including a network, such as a local area network (LAN), a wide area network (WAN), dial-in-connections, cable modems, wireless modems, and/or special high-speed Integrated Services Digital Network (ISDN) lines. A database server 106 is connected to a database 108 containing information on a variety of matters, such as account information related to electric vehicle energy distribution. In one embodiment, centralized database 108 is stored on server system 102 and is accessed directly via at least one delivery point 104. In an alternative embodiment, database 108 is stored remotely from server system 102 and may be non-centralized.

Moreover, in the exemplary embodiment, each delivery point 104 is capable of providing energy, such as electrical energy, to one or more electric vehicles 110. Each electric vehicle 110 stores the energy therein and uses the stored energy for propulsion, rather than, or in addition to, more conventional energy sources, such as gasoline.

As described in more detail below, each electric vehicle 110 includes a unique identifier that is used by delivery point 104 and/or server 102 to identify that electric vehicle 110 and/or an account associated with electric vehicle 110. For example, database 108 may include transactional and/or accounting data related to prepayment information associated with an amount of energy that has been paid for in advance for later distribution to electric vehicle 110. Moreover, database 108 may include historical energy distribution data, such as transaction dates, and/or an amount of energy delivered to electric vehicle 110 for each transaction. Further, database 108 may include historical payment information, such as prepayment dates and/or prepayment amounts.

The embodiments illustrated and described herein as well as embodiments not specifically described herein, but within the scope of aspects of the invention constitute exemplary means for providing metering for an electric vehicle, and more particularly, exemplary means for providing prepaid energy distribution and metering for an electric vehicle. For example, server system 102 or delivery point 104, or any other similar computer device that is programmed with computer-executable instructions as illustrated in FIG. 1, provides exemplary means for providing prepaid energy distribution and metering for an electric vehicle.

Figure 2:
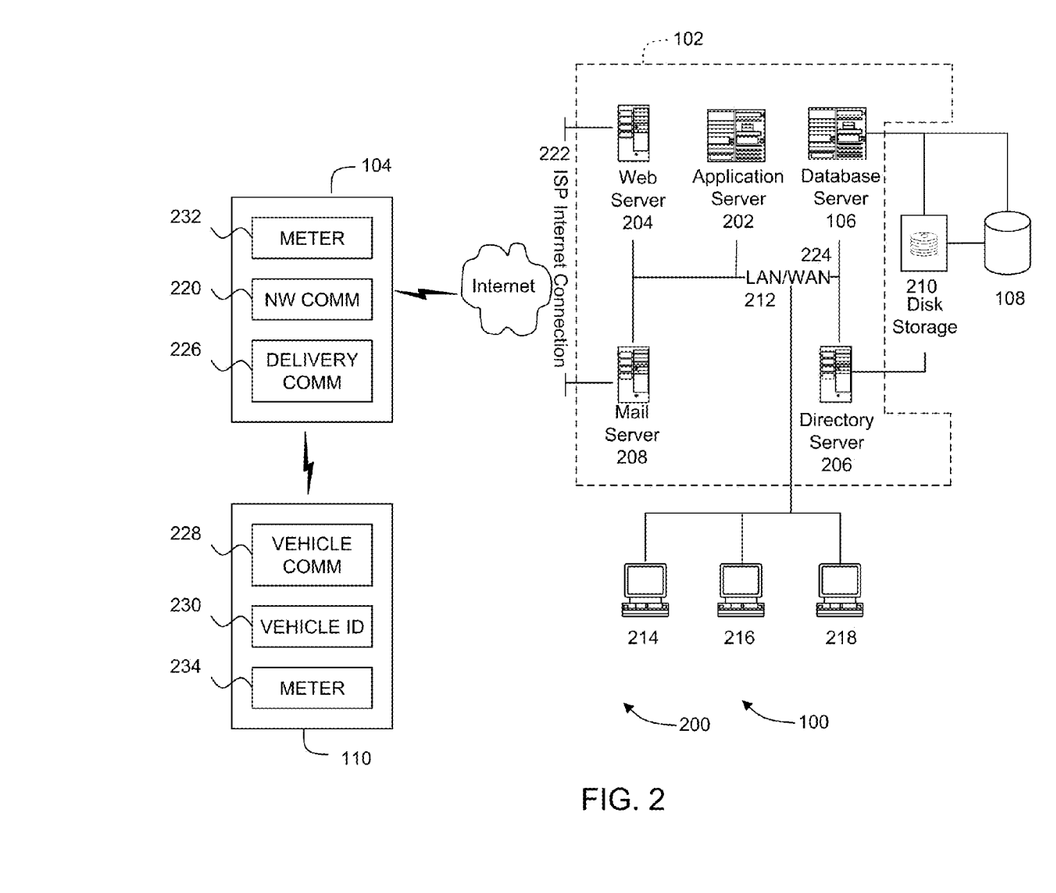
FIG. 2 is an expanded block diagram of an exemplary embodiment of a system architecture of the system shown in FIG. 1.

FIG. 2 is an expanded block diagram of an exemplary embodiment of a system architecture 200 of system 100 (shown in FIG. 1). Components in system architecture 200, identical to components of system 100, are identified in FIG. 2 using the same reference numerals used in FIG. 1. In the exemplary embodiment, system 200 includes server system 102 and energy delivery points 104. Server system 102 also includes database server 106, an application server 202, a web server 204, a directory server 206, and a mail server 208. A disk storage unit 210 is coupled to database server 106 and directory server 206. Examples of disk storage unit 210 may include, but are not limited to only including, a Network Attached Storage (NAS) device and a Storage Area Network (SAN) device. Database server 106 is also coupled to database 108. Servers 106, 202, 204, 206, 206, and 208 are coupled in a local area network (CAN) 212. Moreover, a system administrator workstation 214, a user workstation 216, and a supervisor workstation 218 may be coupled to LAN 212 to enable communication with server system 102. Alternatively, workstations 214, 216, and 218 may be coupled to LAN 212 using an Internet link or may be coupled through an intranet. In one embodiment, an owner or user of electric vehicle 110 may access server system 202 via web server 204 to access, for example, the user's account and/or a prepayment service that enables the user to prepay for energy to be delivered later to electric vehicle 110. Moreover, in one embodiment, mail server 208 may be configured to send a message, such as an email message, to the user when the user's account balance falls below a predetermined threshold. Alternatively, a user may setup a periodic reminder, wherein mail server 208 transmits a message to the user at a configurable periodic rate or when the account balance reaches a predetermined threshold value as a reminder to prepay for energy to be delivered later to electric vehicle 110.

Each energy delivery point 104 includes a network communication module 220 that communicates with server system 102. For example, server system 102 is configured to be communicatively coupled to energy delivery points 104 to enable server system 102 to be accessed using an Internet connection 222 provided by an Internet Service Provider (ISP). The communication in the exemplary embodiment is illustrated as being performed using the Internet, however, any suitable wide area network (WAN) type communication can be utilized in alternative embodiments. More specifically, the systems and processes are not limited to being practiced using only the Internet. In addition, local area network 212 may be used, rather than WAN 224. Each energy delivery point 104 also includes a delivery point communication module 226 that enables energy delivery point 104 to communicate with one or more electric vehicles 110. In addition, local area network 212 may be used rather than WAN 224.

Moreover, in the exemplary embodiment, energy delivery points 104 are electrically and/or communicatively coupled to one or more electric vehicles 110. Each electric vehicle 110 includes a vehicle communication module 228 that enables electric vehicle 110 to communicate with energy delivery point 104. More specifically, vehicle communication module 228 enables electric vehicle 110 to acquire energy from energy delivery point 104 via delivery point communication module 226.

To facilitate communication between electric vehicle 110 and server system 102 via energy delivery point 104, electric vehicle 110 includes a unique vehicle identifier 230 that is embedded within electric vehicle 110. Identifier 230 may be implemented as, for example, a radio frequency identification (RFID) chip. Alternatively, identifier 230 may be implemented as a tag that is embedded in any communication sent to energy delivery point 104 from electric vehicle 110 or from energy delivery point 104 to electric vehicle 110. For example, identifier 230 may be included in any wireless communication packets that are transmitted between vehicle communication module 228 and delivery point communication module 226. As another example, identifier 230 may be included in any communication packets that are transmitted between vehicle communication module 228 and delivery point communication module 226 via physical connection. Moreover, identifier 230 may be implemented using a bar code that is read by a bar code reader (not shown) that is coupled to energy delivery point 104. Furthermore, identifier 230 may be implemented using a two-dimensional bar code that is read by a compatible bar code reader that is coupled to energy delivery point 104. In some embodiments, identifier 230 is a passive tag that does not broadcast information embedded within the identifier 230 but, rather, is read or scanned by a reader or scanner that is coupled to energy delivery point 104.

In the exemplary embodiment, identifier 230 is linked in database 108 to an account associated with electric vehicle 110, in which an account balance is maintained including prepayments that are made to the account by the account owner. Alternatively, identifier 230 may be linked to an account that is associated with a person, such that an account balance allocated among one or more electric vehicles 110. Further, in the exemplary embodiment, each energy delivery point 104 includes an energy meter 232 that tracks an amount of energy delivered to electric vehicle 110. Moreover, electric vehicle 104 includes an energy meter 234 that tracks an amount of energy received by electric vehicle 110.

During use, a customer may make a prepayment by, for example, logging into server system 102 using user workstation 216. The customer may then designate a target account to which the prepayment is to be made, a prepayment amount, and a source account from which the prepayment is to be deducted. The source account may be, for example, a bank account or a credit card. Alternatively, the customer may use a mail-in prepayment slip that is accompanied by a personal check or a credit card number. The customer may also use a telephone to call an energy distributor that operates energy delivery points 104. As another example, the customer may use a cell phone or personal digital assistant to access a prepayment function on server system 102. As yet another example, the customer may prepay for energy at the electric utility office using, for example, a check, cash, or a cashier's check. The customer may also prepay for energy at an office or kiosk of an agent of the energy utility. After the prepayment has been made, an account balance of the customer account is updated to reflect the prepayment.

Thereafter, when the customer wishes to charge electric vehicle 110 via energy delivery point 104, electric vehicle 110 is recognized by energy delivery point 104 according to identifier 230. More specifically, energy delivery point 104 reads identifier 230 using, for example, an RFID reader, where identifier 230 is an RFID chip. Alternatively, energy delivery point 104 and electric vehicle 10 may be communicatively coupled by an active wireless connection, and identifier 230 may be transmitted by vehicle communication module 228 to delivery point communication module 226 using the wireless connection. In another example, energy delivery point 104 and electric vehicle 110 may be communicatively coupled by a physical communication connection, and identifier 230 may be transmitted by vehicle communication module 228 to delivery point communication module 226 using the physical connection. Energy delivery point 104 transmits identifier 230 to server system 102 in order to determine an account associated with identifier 230.

Once server system 102 has identified an account associated with identifier 230, server system 102 determines an account balance. If the account balance does not meet a predetermined threshold, server system 102 may instruct energy delivery point 104 to deny service to electric vehicle 110 and display a message to the customer stating the reason for the denial. Alternatively, server system 102 may instruct energy delivery point 104 to enable service to electric vehicle 10. In such a case, server system 102 may issue a temporary credit to the account balance. In one embodiment, energy delivery point 104 meters energy delivery to electric vehicle using a different rate, such as a higher rate, when a temporary credit is issued. In an alternative embodiment, server system 102 may instruct energy delivery point 104 to deny service to electric vehicle 110 when the account associated with identifier 230 has been put into a hold state. A hold state may be placed on the account based on, for example, a delinquent payment by the customer and/or a report of electric vehicle 110 being stolen. In the exemplary embodiment, when service to electric vehicle 110 is enabled, energy delivery point 104 will deliver an amount of energy to electric vehicle 110. During the delivery, both energy delivery point 104 and electric vehicle 110 meter the amount of energy delivered and/or a transaction amount related to the amount of energy delivered, via delivery point meter 232 and vehicle meter 234, respectively. A final transaction amount is determined at the conclusion of the energy delivery, and the final transaction amount is transmitted to server system 102. Server system 102 then deducts the final transaction amount from the account balance. If the final transaction amount is greater than the account balance, server system 102 may issued a temporary credit using a different rate, such as a higher rate, as described above. In addition, in one embodiment, upon the conclusion of energy delivery, delivery point meter 232 and vehicle meter 234 compare the amount of energy delivered and/or the final transaction amount. If the comparison results in a match, then vehicle meter 234 generates a receipt. In one embodiment, the receipt is stored in vehicle meter 234. In another embodiment, the receipt is also transmitted to energy delivery point 104 for storage in server system 102.

Figure 3:
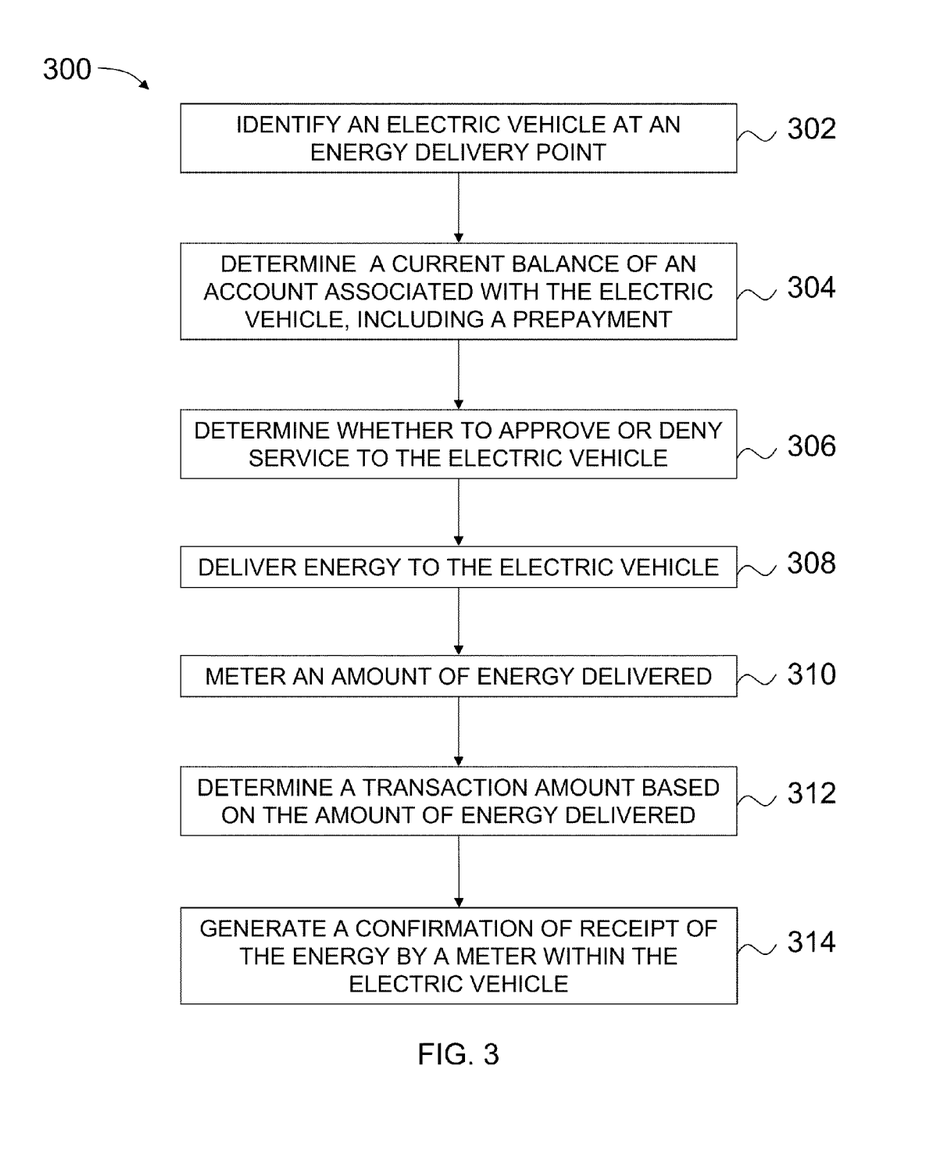
FIG. 3 is a flowchart illustrating an exemplary method for use in providing metering of energy distribution to electric vehicle using the system shown in FIGS. 1 and 2.

FIG. 3 is a flowchart 300 illustrating an exemplary method for providing metering of energy distribution to electric vehicle 110 (shown in FIGS. 1 and 2). In the exemplary embodiment, electric vehicle 110 is identified 302 at energy delivery point 104 (shown in FIGS. 1 and 2). More specifically, energy delivery point 104 reads a unique identifier 230 (shown in FIG. 2) embedded in electric vehicle 110. In one embodiment, identifier 230 is stored in an RFID tag and energy delivery point 104 includes an RFID reader configured to read identifier 230. In an alternative embodiment, energy delivery point 104 receives identifier 230 via an actively powered wireless link. In another alternative embodiment, energy delivery point 104 receives identifier 230 via a physical connection between electric vehicle 110 and energy delivery point 104. In the exemplary embodiment, electric vehicle 110 and, more specifically, identifier 230 is associated with a customer account.

When identifier 230 has been read, a current balance of the customer account associated with identifier 230 is determined 304, wherein the current balance includes at least a portion of a prepayment amount that is based on a predetermined amount of energy to be delivered to electric vehicle 110 at energy delivery point 104. More specifically, energy delivery point 104 transmits identifier 230 to server system 102 (shown in FIGS. 1 and 2) using, for example, the Internet and/or an intranet. Server system 102 determines the user account associated with identifier 230 within database 108 (shown in FIGS. 1 and 2). Server system 102 then determines the current account balance. In one embodiment, server system 102 then determines 306 whether to approve or deny energy delivery from energy delivery point 104 to electric vehicle 110. For example, if the current balance is less than a threshold amount, the customer is denied service at energy delivery point 104. In such an embodiment, the customer may also be prompted to insert a credit card or cash into a card reader within energy delivery point 104. As another example, service may be denied by server system 102 due to a stolen car report associated with electric vehicle 110. In the exemplary embodiment, the current account balance may be increased by the account owner remotely using, for example, user workstation 216 (shown in FIG. 2). For example, the customer may login to server system 202 via user workstation 216 in order to access a prepayment program that enables the customer to designate a prepayment amount to be applied to the account balance. The customer also designates a payment source including, but not limited to only including, a credit card, a debit card, and/or a banking account. The prepayment amount is then credited to the account balance.

In the exemplary embodiment, energy is then delivered 308 to electric vehicle 110 via energy delivery point 104. A transaction amount is determined based on an actual amount of energy delivered to electric vehicle 110 at energy delivery point 104. More specifically, delivery point meter 232 (shown in FIG. 2) meters 310 the amount of energy delivered and a transaction amount is determined 312 based on the metered amount of energy delivered. In one embodiment, energy delivery point 104 determines a transaction amount based on the amount of energy delivered and transmits the transaction amount to server system 102. In an alternative embodiment, energy delivery point 104 transmits the amount of energy delivered to server system 102, and server system 102 determines the transaction amount based on the amount of energy delivered. In the exemplary embodiment, the transaction amount is then compared to the current balance in the customer account. If the transaction amount is less than the current balance, the transaction amount is deducted from the current balance. The new balance is then stored in database 108. In one embodiment, the new balance is transmitted by server system 102 to energy delivery point 104 and displayed to the customer. In an alternative embodiment, the new balance is also transmitted to electric vehicle 110 by energy delivery point 104 and displayed to the customer via vehicle meter 234. If the current balance is less than the transaction amount, the customer account may be credited with the difference between the transaction amount and the current balance and the customer billed for the difference at a later time. In such an embodiment, the billing rate may be changed for any energy distributed on credit. Alternatively, the customer may be prompted to submit payment at energy delivery point 104. For example, the customer may be prompted to insert a credit card into a card reader within energy delivery point 104. In the exemplary embodiment, a confirmation of the receipt of the delivered energy is generated 314 by vehicle meter 234. The receipt may be used by the customer to verify an amount of energy delivered and/or a cost per unit energy. The receipt may be generated by electric vehicle 110 and stored in electric vehicle 110 and database 108. Alternatively, the receipt may be generated by server system 102, stored in database 108, and transmitted to electric vehicle 110 via energy delivery point 104. In addition, in one embodiment, an adjusted current balance may be displayed to the customer via energy delivery point 104 to reflect a deduction of the transaction amount from the account.

Described in detail herein are exemplary embodiments of methods, systems, and computers that facilitate metering electricity consumption for vehicles, such as electric vehicles. Moreover, the embodiments described herein facilitate billing in advance for energy to be delivered to an electric vehicle at a later time. Billing in advance for future services such as energy distribution enables customers and businesses to plan for current and/or future costs and revenues. In addition, customers may be offered a lower billing rate for prepayment. Moreover, billing in advance for future services enables customers to obtain energy at any energy delivery point that includes a means of reading or receiving a unique identifier within the customer's electric vehicle that is associated with a customer account to which the prepayment is credited. Further, the embodiments described herein facilitate enabling a customer to obtain energy for an electric vehicle in spite of an account balance that is lower than the transaction amount. Enabling such an automatic crediting function enables the customer to obtain energy on, for example, an emergency basis, and also enables the business to charge an additional fee or a higher rate for such a function.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assembly packages and methods.

While the invention has been described in terms of various specific embodiments, those skilled in the art will recognize that the invention can be practiced with modification within the spirit and scope of the claims.

What is claimed is:

1. A method for delivering energy to an electric vehicle, said method comprising:
   identifying, by an energy point server system, the electric vehicle at an energy delivery point, wherein the electric vehicle is associated with a customer account;
   determining, by the energy point server system, a current balance of the customer account, wherein the current balance includes at least a portion of a prepayment amount based on a predetermined amount of energy to be delivered to the electric vehicle at the energy delivery point;
   delivering energy to the electric vehicle;
   metering, by the energy point server system and the electric vehicle, an actual amount of energy delivered to the electric vehicle;
   comparing the amount of delivered energy metered by the energy point server system and the electric vehicle;
   determining, by the energy point server system, a transaction amount based on a first billing rate for the actual amount of energy delivered to the electric vehicle at the energy delivery point;
   determining, by the energy point server system, whether the transaction amount exceeds the current balance of the customer account; and
   applying, by the energy point server system, a second billing rate for the actual amount of energy delivered to the electric vehicle when the transaction amount exceeds the current balance of the customer account.

2. The method in accordance with claim 1, further comprising receiving the prepayment amount in response to a bill corresponding to the predetermined amount of energy to be delivered.

3. The method in accordance with claim 1, wherein identifying the electric vehicle at an energy delivery point comprises reading a unique identifier from a passive tag embedded in the electric vehicle and associated with the customer account using a scanner.

4. The method in accordance with claim 1, wherein identifying the electrical vehicle at an energy delivery point comprises receiving a unique identifier associated with the electric vehicle and the customer account via an actively powered wireless link.

5. The method in accordance with claim 1, wherein identifying the electric vehicle at an energy delivery point comprises receiving a unique identifier associated with the electric vehicle and the customer account via a physical connection between the electric vehicle and the energy delivery point.

6. The method in accordance with claim 1, further comprising denying service at the energy delivery point when the current account balance is less than a threshold amount.

7. The method in accordance with claim 1, wherein when the current balance is less than the transaction amount, said method further comprises crediting the customer account with the difference between the transaction amount and the current balance.

8. The method in accordance with claim 7, wherein crediting the customer account with the difference between the transaction amount and the current balance further comprises applying a second billing rate for the difference between the actual amount of energy delivered to the electric vehicle and the current balance of the customer account.

9. The method in accordance with claim 1, further comprising generating a confirmation, by a meter within the electric vehicle, that the amount of energy delivered was received by the electric vehicle.

10. The method in accordance with claim 1, wherein applying a second billing rate comprises applying a second billing rate for the difference between the actual amount of energy delivered to the electric vehicle and the current balance of the customer account when the transaction amount exceeds the current balance of the customer account.

11. A system for providing energy to an electric vehicle, said system comprising:
an energy delivery point configured to receive a unique identifier embedded in the electric vehicle, deliver energy to the electric vehicle, meter, by the energy point and the electric vehicle, an actual amount of energy delivered to the electric vehicle, and compare the amount of delivered energy metered by the energy point and the electric vehicle; and
a server coupled to said energy delivery point, said server configured to:
receive the unique identifier from said energy delivery point;
identify the electric vehicle based on the unique identifier, wherein the electric vehicle is associated with a customer account;
determine a current balance of the customer account, wherein the current balance includes at least a portion of a prepayment amount associated with a predetermined amount of energy to be delivered to the electric vehicle by said energy delivery point;
determine a transaction amount based on a first billing rate for the actual amount of energy delivered to the electric vehicle;
determine whether the transaction amount exceeds the current balance of the customer account; and
apply a second billing rate for the actual amount of energy delivered to the electric vehicle when the transaction amount exceeds the current balance of the customer account.

12. The system in accordance with claim 11, wherein said server is configured to receive the prepayment amount in response to a bill corresponding to the predetermined amount of energy to be delivered.

13. The system in accordance with claim 11, wherein said energy delivery point is configured to receive the unique identifier from the electric vehicle via one of a wireless link and a physical connection.

14. The system in accordance with claim 11, wherein said server is configured to deny service at said energy delivery point when the current account balance is less than a threshold amount.

15. The system in accordance with claim 11, wherein said server is configured to credit the customer account with the difference between the transaction amount and the current balance when the current balance is less than the transaction amount.

16. The system in accordance with claim 11, wherein a confirmation that the amount of energy delivered was received by the electric vehicle is generated by a meter within the electric vehicle.

17. A system comprising:
a controller coupled to an energy delivery point and a database, said controller programmed to:
receive a unique identifier from the energy delivery point, wherein the unique identifier is acquired by the energy delivery point from an electric vehicle;
identify the electric vehicle based on the unique identifier, wherein the electric vehicle is associated with a customer account;
determine a current balance of the customer account, wherein the current balance includes at least a portion of a prepayment amount associated with a predetermined amount of energy to be delivered to the electric vehicle by the energy delivery point;
receive, from the energy delivery point, an actual amount of energy delivered to the electric vehicle, wherein the amount of energy delivered is metered by the energy delivery point and by the electric vehicle;
compare the amount of delivered energy metered at the energy delivery point and at the electric vehicle;
determine a transaction amount based on a first billing rate for the actual amount of energy delivered to the electric vehicle;
determine whether the transaction amount exceeds the current balance of the customer account; and
apply a second billing rate for the actual amount of energy delivered to the electric vehicle when the transaction amount exceeds the current balance of the customer account.

18. The controller in accordance with claim 17, wherein said controller is further programmed to receive the prepayment amount in response to a bill corresponding to the predetermined amount of energy to be delivered.

19. The controller in accordance with claim 17, wherein said controller is further programmed to determine the customer account associated with the unique identifier using said database.

20. The controller in accordance with claim 17, wherein said controller is further programmed to deny service at the energy delivery point when the current account balance is less than a threshold amount.

21. The controller in accordance with claim 17, wherein said controller is further configured to credit the customer account with the difference between the transaction amount and the current balance when the current balance is less than the transaction amount.

22. The controller in accordance with claim 21, wherein said controller is further programmed to adjust a subsequent bill associated with the customer account by including one of a surcharge and an additional billed amount representative of the difference between the transaction amount and the current balance.

* * * * *

UNITED STATES PATENT AND TRADEMARK OFFICE
CERTIFICATE OF CORRECTION

| | | |
|---|---|---|
| PATENT NO. | : 8,583,551 B2 | Page 1 of 1 |
| APPLICATION NO. | : 12/341467 | |
| DATED | : November 12, 2013 | |
| INVENTOR(S) | : Littrell et al. | |

It is certified that error appears in the above-identified patent and that said Letters Patent is hereby corrected as shown below:

On Title Page 3, Item (56), under "OTHER PUBLICATIONS", in Column 2, Line 2, delete "Techncal" and insert -- Technical --, therefor.

On Title Page 3, Item (56), under "OTHER PUBLICATIONS", in Column 2, Line 28, delete "2 pagea," and insert -- 2 pages, --, therefor.

In the Specification

In Column 5, Line 53, delete "(CAN)" and insert -- (LAN) --, therefor.

In Column 7, Line 1, delete "vehicle 104" and insert -- vehicle 110 --, therefor.

In Column 7, Line 28, delete "vehicle 10" and insert -- vehicle 110 --, therefor.

In Column 7, Lines 47-48, delete "vehicle 10." and insert -- vehicle 110. --, therefor.

Signed and Sealed this
Eighth Day of April, 2014

Michelle K. Lee
*Deputy Director of the United States Patent and Trademark Office*